US011869000B2

(12) United States Patent
Mokhasi et al.

(10) Patent No.: US 11,869,000 B2
(45) Date of Patent: Jan. 9, 2024

(54) SYSTEM, METHOD, AND COMPUTER PROGRAM PRODUCT FOR UPDATING AND PROCESSING PAYMENT DEVICE TRANSACTION TOKENS

(71) Applicant: Visa International Service Association, San Francisco, CA (US)

(72) Inventors: Gaurav Srikant Mokhasi, Evanston, IL (US); Kaushik Kumar Mahato, Jamshedpur (IN); Rahul Raghavan, Bengaluru (IN)

(73) Assignee: Visa International Service Association, San Francisco, CA (US)

( * ) Notice: Subject to any disclaimer, the term of this patent is extended or adjusted under 35 U.S.C. 154(b) by 225 days.

(21) Appl. No.: 17/534,585

(22) Filed: Nov. 24, 2021

(65) Prior Publication Data

US 2022/0084018 A1   Mar. 17, 2022

Related U.S. Application Data

(63) Continuation of application No. 16/278,385, filed on Feb. 18, 2019, now Pat. No. 11,210,666.

(51) Int. Cl.
*G06Q 20/38* (2012.01)
*G06Q 20/40* (2012.01)
*G06F 16/23* (2019.01)

(52) U.S. Cl.
CPC ....... *G06Q 20/385* (2013.01); *G06Q 20/4016* (2013.01); *G06F 16/23* (2019.01)

(58) Field of Classification Search
None
See application file for complete search history.

(56) References Cited

U.S. PATENT DOCUMENTS 10,002,352 B2   6/2018   Bondesen et al.
10,402,897 B1 *  9/2019   Czyzewski ............ G06Q 40/00
(Continued)

FOREIGN PATENT DOCUMENTS

WO   2017066792 A1   4/2017

OTHER PUBLICATIONS

Amit Kumar, Deletion of a Given Node from a Linked List, 2017, entire document pertinent, retrieved from https://www.codesdope.com/blog/article/deletion-of-a-give-node-from-a-linked-list-in-c/ (Year: 2017).*

(Continued)

*Primary Examiner* — Gregory S Cunningham, II
(74) *Attorney, Agent, or Firm* — The Webb Law Firm

(57) ABSTRACT

Described are a system, method, and computer program product for updating and processing payment device transaction tokens. The method includes receiving a first notification based on issuance of a first new payment device, generating a first new token associated with the first new payment device, and linking the first new token to a previous token. The method also includes receiving a second notification based on issuance of a second new payment device, generating a second new token associated with the second new payment device, and linking the second new token to the first new token in a chain. The method further includes determining to deactivate the first new payment device and modifying the chain to remove the first new token. The method further includes receiving a transaction request and processing the transaction request by communicating second new token to an issuer.

20 Claims, 5 Drawing Sheets

(56) References Cited

U.S. PATENT DOCUMENTS

| | | | |
|---|---|---|---|
| 10,657,527 B1 | 5/2020 | Easley et al. | |
| 2010/0299230 A1 | 11/2010 | Patterson et al. | |
| 2011/0302079 A1* | 12/2011 | Neuhaus | G06Q 30/0201 |
| | | | 705/39 |
| 2013/0103581 A1 | 4/2013 | Barry et al. | |
| 2015/0032627 A1 | 1/2015 | Dill et al. | |
| 2015/0339663 A1 | 11/2015 | Lopreiato et al. | |
| 2016/0125405 A1 | 5/2016 | Alterman et al. | |
| 2016/0189123 A1 | 6/2016 | Specogna et al. | |
| 2017/0109745 A1 | 4/2017 | Al-Bedaiwi et al. | |
| 2017/0116585 A1 | 4/2017 | Rosano | |
| 2019/0114633 A1 | 4/2019 | Gandhi et al. | |
| 2019/0349360 A1* | 11/2019 | Yeddula | H04L 63/0807 |
| 2021/0051015 A1* | 2/2021 | Widmann | H04L 9/0866 |

OTHER PUBLICATIONS

Kumar, "Deletion of a Given Node from a Linked List", 2017, retrieved from https://www.codesdope.com/blog/article/deletion-of-a-give-node-from-a-linked-list-in-c/, 6 pages.

* cited by examiner

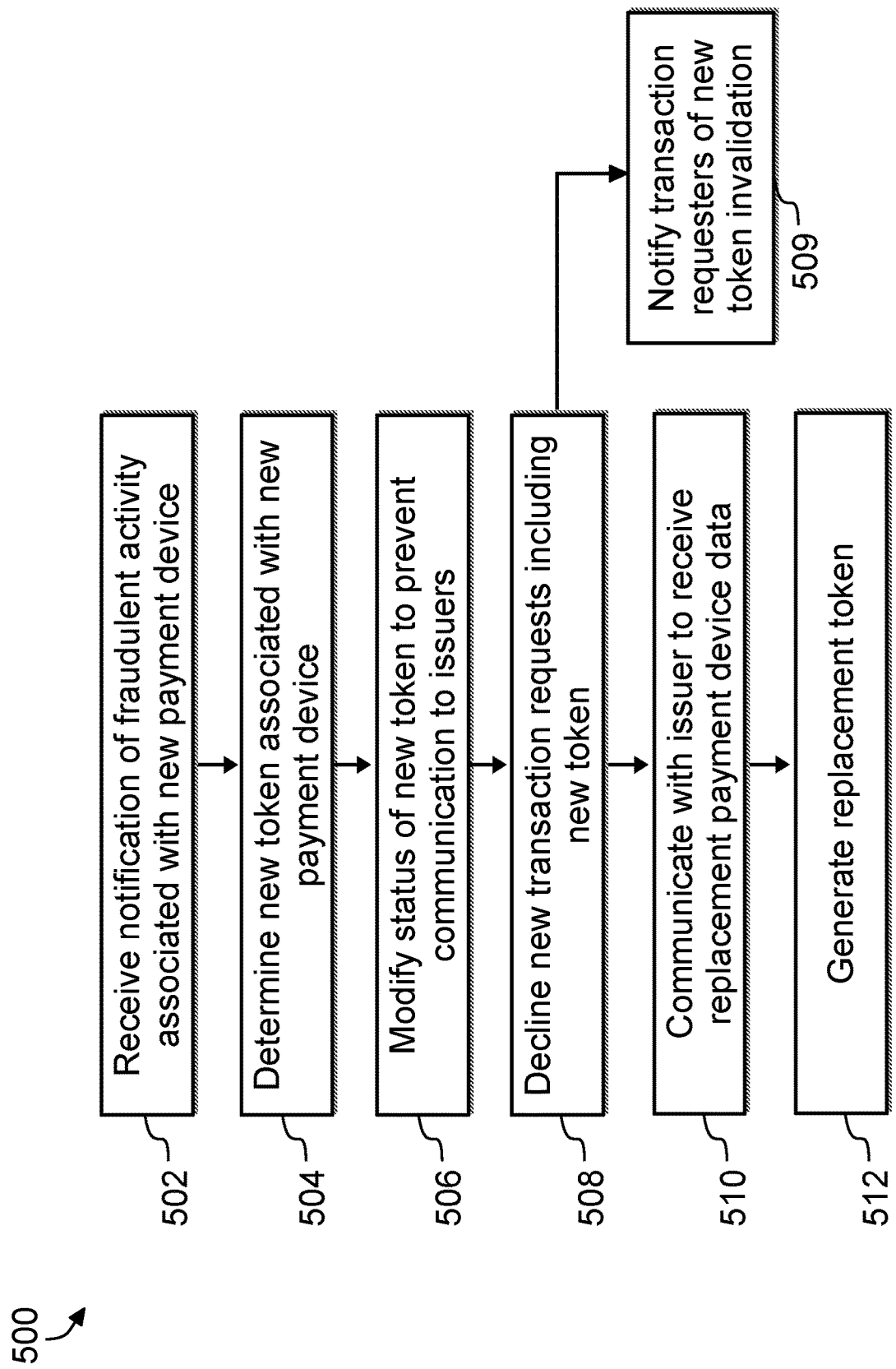

SYSTEM, METHOD, AND COMPUTER PROGRAM PRODUCT FOR UPDATING AND PROCESSING PAYMENT DEVICE TRANSACTION TOKENS

CROSS-REFERENCE TO RELATED APPLICATION

This application is a continuation of U.S. patent application Ser. No. 16/278,385, filed Feb. 18, 2019, titled "System, Method, and Computer Program Product for Updating and Processing Payment Device Transaction Tokens", the entire disclosure of which is incorporated by reference herein.

BACKGROUND

Technical Field

This disclosure relates generally to payment device tokenization and, in some embodiments or aspects, to a system, method, and computer program product for generating, storing, and processing new payment device tokens in relation to old payment device tokens.

Technical Considerations

When a payment device is used to complete a transaction with a merchant, or is identified as a primary method of payment for a merchant, a token corresponding to the payment device may be created and saved in a database of the merchant. A token corresponding to a payment device may also be created for any entity or computing device configured to store a payment device identifier to facilitate transactions. For recurring transactions with a merchant or other token holder, the token may be used to automatically complete the transactions without an account holder individually authorizing each transaction with the payment device. Over time, a number of token holders may each be assigned their own unique token corresponding to the payment device. While generating and assigning tokens to token holders may simplify transactions in some circumstances, technical complications may occur from events where the old tokens must be replaced with new tokens. For example, a new payment device may be issued to an account holder because of updated security protocols. It is computationally and communicatively inefficient for the account holder or a token generation system to identify and notify or update each token holder to purge or replace old tokens with new tokens. Moreover, if a token holder is not notified or the prior token assigned to the token holder is not updated, in prior art systems, then token holders may continue to attempt to complete transactions using old tokens that are now non-functioning. Failed transactions with outdated tokens may generate computer processing errors, and with respect to the account holder, may incur penalties for missed payments.

Therefore, there is a need in the art for a system and method of replacing or updating payment devices or payment-device tokens without the requirement of identifying, notifying, and updating tokens of each token holder. There is a further need in the art for such a technical solution to be resilient and functional over multiple token/payment device updates.

SUMMARY

Accordingly, and generally, provided is an improved system, method, and computer program product for updating and processing payment device transaction tokens. Preferably, provided is a system, method, and computer program product for receiving an update request to update stored transaction information, the update request identifying an old payment device and a new payment device. Preferably, provided is a system, method, and computer program product for generating a new token associated with the new payment device, and linking the new token to an old token. Preferably, provided is a system, method, and computer program product for receiving a transaction request including the old token, and communicating the new token that is linked to the old token to an issuer for processing the transaction request.

According to non-limiting embodiments or aspects, provided is a computer-implemented method for updating and processing payment device transaction tokens. The method includes (a) receiving, with at least one processor, an update request to update stored transaction information. The update request identifies at least one old payment device and at least one new payment device. The method also includes (b) generating, with at least one processor, at least one new token associated with the at least one new payment device. The method further includes (c) linking, with at least one processor and in at least one database, the at least one new token to at least one old token. The method further includes (d) receiving, with at least one processor, a transaction request including the at least one old token. The method further includes (e) communicating, with at least one processor, the at least one new token that is linked to the at least one old token to an issuer for processing of the transaction request.

In further non-limiting embodiments or aspects, the method may include modifying, with at least one processor, a status of the at least one old token associated with the at least one old payment device to prevent the at least one old token from being communicated to issuers. The method may further include repeating steps (a)-(c) for a plurality of update requests, thereby linking three or more tokens in a chain, wherein a token generated in response to a most recent update request of the plurality of update requests is communicated to an issuer when processing the transaction request including any of the three or more tokens in the chain.

In further non-limiting embodiments or aspects, the at least one old token may include a plurality of old tokens, step (b) may include generating, with at least one processor, the at least one new token for each old token, and step (c) may include linking, with at least one processor and in the at least one database, the at least one new token to each old token. Each of the at least one new token may be unique.

In further non-limiting embodiments or aspects, the method may include receiving, with at least one processor, a notification of fraudulent activity associated with the at least one old payment device. The method may also include modifying, with at least one processor and in at least one database, storage of the at least one new token to deactivate a link to the at least one old token. The method may further include declining, with at least one processor, new transaction requests including the at least one old token.

In further non-limiting embodiments or aspects, the method may include receiving, with at least one processor, a notification of fraudulent activity associated with the at least one new payment device. The method may also include modifying, with at least one processor, a status of the at least one new token associated with the at least one new payment device to prevent the at least one new token from being communicated to issuers. The method may further include declining, with at least one processor, new transaction requests including the at least one old token and/or the at least one new token.

According to non-limiting embodiments or aspects, provided is a system for updating and processing payment device transaction tokens. The system includes a server including at least one processor for executing program instructions. The server is programmed and/or configured to (a) receive an update request to update stored transaction information. The update request identifies at least one old payment device and at least one new payment device. The server is also programmed and/or configured to (b) generate at least one new token associated with the at least one new payment device. The server is further programmed and/or configured to (c) link, in at least one database, the at least one new token to at least one old token. The server is further programmed and/or configured to (d) receive a transaction request including the at least one old token. The server is further programmed and/or configured to (e) communicate the at least one new token that is linked to the at least one old token to an issuer for processing of the transaction request.

In further non-limiting embodiments or aspects, the server may be programmed and/or configured to modify a status of the at least one old token associated with the at least one old payment device to prevent the at least one old token from being communicated to issuers. The server may be further programmed and/or configured to repeat steps (a)-(c) for a plurality of update requests, thereby linking three or more tokens in a chain, wherein a token generated in response to a most recent update request of the plurality of update requests is communicated to an issuer when processing the transaction request including any of the three or more tokens in the chain.

In further non-limiting embodiments or aspects, the at least one old token may include a plurality of old tokens, step (b) may include generating the at least one new token for each old token, and step (c) may include linking, in the at least one database, the at least one new token to each old token. Each of the at least one new token may be unique.

In further non-limiting embodiments or aspects, the server may be programmed and/or configured to receive a notification of fraudulent activity associated with the at least one old payment device. The server may also be programmed and/or configured to modify, in at least one database, storage of the at least one new token to deactivate a link to the at least one old token. The server may further be programmed and/or configured to decline new transaction requests including the at least one old token.

In further non-limiting embodiments or aspects, the server may be programmed and/or configured to receive a notification of fraudulent activity associated with the at least one new payment device. The server may also be programmed and/or configured to modify a status of the at least one new token associated with the at least one new payment device to prevent the at least one new token from being communicated to issuers. The server may further be programmed and/or configured to decline new transaction requests including the at least one old token and/or the at least one new token.

According to non-limiting embodiments or aspects, provided is a computer program product for updating and processing payment device transaction tokens. The computer program product includes at least one non-transitory computer-readable medium including program instructions that, when executed by at least one processor, cause the at least one processor to (a) receive an update request to update stored transaction information. The update request identifies at least one old payment device and at least one new payment device. The program instructions further cause the at least one processor to (b) generate at least one new token associated with the at least one new payment device. The program instructions further cause the at least one processor to (c) link, in at least one database, the at least one new token to at least one old token. The program instructions further cause the at least one processor to (d) receive a transaction request including the at least one old token. The program instructions further cause the at least one processor to (e) communicate the at least one new token that is linked to the at least one old token to an issuer for processing of the transaction request.

In non-limiting embodiments or aspects, the program instructions may cause the at least one processor to modify a status of the at least one old token associated with the at least one old payment device to prevent the at least one old token from being communicated to issuers. The program instructions may further cause the at least one processor to repeat steps (a)-(c) for a plurality of update requests, thereby linking three or more tokens in a chain, wherein a token generated in response to a most recent update request of the plurality of update requests is communicated to an issuer when processing the transaction request including any of the three or more tokens in the chain.

In non-limiting embodiments or aspects, the at least one old token may include a plurality of old tokens, step (b) may include generating the at least one new token for each old token, and step (c) may include linking, in the at least one database, the at least one new token to each old token, wherein each of the at least one new token is unique.

In non-limiting embodiments or aspects, the program instructions may cause the at least one processor to receive a notification of fraudulent activity associated with the at least one old payment device. The program instructions may also cause the at least one processor to modify, in at least one database, storage of the at least one new token to deactivate a link to the at least one old token. The program instructions may further cause the at least one processor to decline new transaction requests including the at least one old token.

In non-limiting embodiments or aspects, the program instructions may cause the at least one processor to receive a notification of fraudulent activity associated with the at least one new payment device. The program instructions may also cause the at least one processor to modify a status of the at least one new token associated with the at least one new payment device to prevent the at least one new token from being communicated to issuers. The program instructions may further cause the at least one processor to decline new transaction requests including the at least one old token and/or the at least one new token.

Other non-limiting embodiments or aspects of the present disclosure will be set forth in the following numbered clauses:

Clause 1: A computer-implemented method for updating and processing payment device transaction tokens, the method comprising: (a) receiving, with at least one processor, an update request to update stored transaction information, the update request identifying at least one old payment device and at least one new payment device; (b) generating, with at least one processor, at least one new token associated with the at least one new payment device; (c) linking, with at least one processor and in at least one database, the at least one new token to at least one old token; (d) receiving, with at least one processor, a transaction request comprising the at least one old token; and (e) communicating, with at least one processor, the at least one new token that is linked to the at least one old token to an issuer for processing of the transaction request.

Clause 2: The method of clauses 1, further comprising modifying, with at least one processor, a status of the at least one old token associated with the at least one old payment device to prevent the at least one old token from being communicated to issuers.

Clause 3: The method of clauses 1 or 2, further comprising repeating steps (a)-(c) for a plurality of update requests, thereby linking three or more tokens in a chain, wherein a token generated in response to a most recent update request of the plurality of update requests is communicated to an issuer when processing the transaction request comprising any of the three or more tokens in the chain.

Clause 4: The method of any of clauses 1-3, wherein the at least one old token comprises a plurality of old tokens, step (b) further comprises generating, with at least one processor, the at least one new token for each old token, and step (c) further comprises linking, with at least one processor and in the at least one database, the at least one new token to each old token.

Clause 5: The method of any of clauses 1-4, wherein each of the at least one new token is unique.

Clause 6: The method of any of clauses 1-5, further comprising: receiving, with at least one processor, a notification of fraudulent activity associated with the at least one old payment device; modifying, with at least one processor and in at least one database, storage of the at least one new token to deactivate a link to the at least one old token; and declining, with at least one processor, new transaction requests comprising the at least one old token.

Clause 7: The method of any of clauses 1-6, further comprising: receiving, with at least one processor, a notification of fraudulent activity associated with the at least one new payment device; modifying, with at least one processor, a status of the at least one new token associated with the at least one new payment device to prevent the at least one new token from being communicated to issuers; and declining, with at least one processor, new transaction requests comprising the at least one old token and/or the at least one new token.

Clause 8: A system for updating and processing payment device transaction tokens, the system comprising a server including at least one processor for executing program instructions, the server being programmed and/or configured to: (a) receive an update request to update stored transaction information, the update request identifying at least one old payment device and at least one new payment device; (b) generate at least one new token associated with the at least one new payment device; (c) link, in at least one database, the at least one new token to at least one old token; (d) receive a transaction request comprising the at least one old token; and (e) communicate the at least one new token that is linked to the at least one old token to an issuer for processing of the transaction request.

Clause 9: The system of clauses 8, wherein the server is further programmed and/or configured to modify a status of the at least one old token associated with the at least one old payment device to prevent the at least one old token from being communicated to issuers.

Clause 10: The system of clauses 8 or 9, wherein the server is further programmed and/or configured to repeat steps (a)-(c) for a plurality of update requests, thereby linking three or more tokens in a chain, wherein a token generated in response to a most recent update request of the plurality of update requests is communicated to an issuer when processing the transaction request comprising any of the three or more tokens in the chain.

Clause 11: The system of any of clauses 8-10, wherein the at least one old token comprises a plurality of old tokens, step (b) further comprises generating the at least one new token for each old token, and step (c) further comprises linking, in the at least one database, the at least one new token to each old token.

Clause 12: The system of any of clauses 8-11, wherein each of the at least one new token is unique.

Clause 13: The system of any of clauses 8-12, wherein the server is further programmed and/or configured to: receive a notification of fraudulent activity associated with the at least one old payment device; modify, in at least one database, storage of the at least one new token to deactivate a link to the at least one old token; and decline new transaction requests comprising the at least one old token.

Clause 14: The system of any of clauses 8-13, wherein the server is further programmed and/or configured to: receive a notification of fraudulent activity associated with the at least one new payment device; modify a status of the at least one new token associated with the at least one new payment device to prevent the at least one new token from being communicated to issuers; and decline new transaction requests comprising the at least one old token and/or the at least one new token.

Clause 15: A computer program product for updating and processing payment device transaction tokens, the computer program product comprising at least one non-transitory computer-readable medium including program instructions that, when executed by at least one processor, cause the at least one processor to: (a) receive an update request to update stored transaction information, the update request identifying at least one old payment device and at least one new payment device; (b) generate at least one new token associated with the at least one new payment device; (c) link, in at least one database, the at least one new token to at least one old token; (d) receive a transaction request comprising the at least one old token; and (e) communicate the at least one new token that is linked to the at least one old token to an issuer for processing of the transaction request.

Clause 16: The computer program product of clauses 15, wherein the program instructions further cause the at least one processor to modify a status of the at least one old token associated with the at least one old payment device to prevent the at least one old token from being communicated to issuers.

Clause 17: The computer program product of clauses 15 or 16, wherein the program instructions further cause the at least one processor to repeat steps (a)-(c) for a plurality of update requests, thereby linking three or more tokens in a chain, wherein a token generated in response to a most recent update request of the plurality of update requests is communicated to an issuer when processing the transaction request comprising any of the three or more tokens in the chain.

Clause 18: The computer program product of any of clauses 15-17, wherein the at least one old token comprises a plurality of old tokens, step (b) further comprises generating the at least one new token for each old token, and step (c) further comprises linking, in the at least one database, the at least one new token to each old token, wherein each of the at least one new token is unique.

Clause 19: The computer program product of any of clauses 15-18, wherein the program instructions further cause the at least one processor to: receive a notification of fraudulent activity associated with the at least one old payment device; modify, in at least one database, storage of the at least one new token to deactivate a link to the at least one old token; and decline new transaction requests comprising the at least one old token.

Clause 20: The computer program product of any of clauses 15-19, wherein the program instructions further cause the at least one processor to: receive a notification of fraudulent activity associated with the at least one new payment device; modify a status of the at least one new token associated with the at least one new payment device to prevent the at least one new token from being communicated to issuers; and decline new transaction requests comprising the at least one old token and/or the at least one new token.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments or aspects that are illustrated in the accompanying schematic figures, in which:

FIG. 5 is a process diagram of embodiments or aspects of a system for updating and processing payment device transaction tokens.

DETAILED DESCRIPTION

Figure 1:
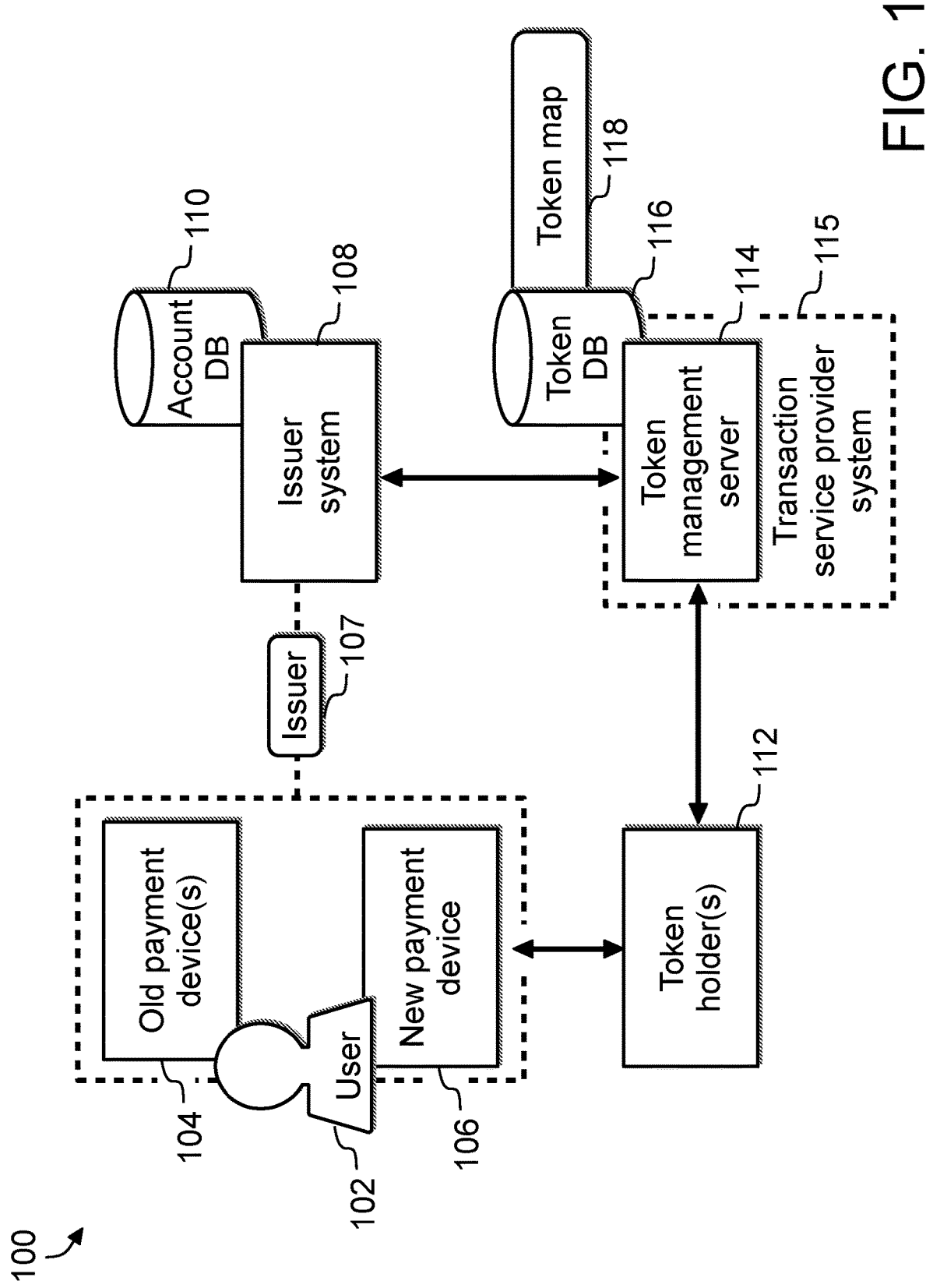
FIG. 1 is a schematic diagram of embodiments or aspects of a system for updating and processing payment device transaction tokens.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the illustrated embodiments are not to be interpreted as limiting and may assume various alternative variations and step sequences, except where expressly specified to the contrary. It is also to be understood that the specific devices and processes illustrated in the attached drawings, and described in the following specification, are simply exemplary embodiments or aspects of the present disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments or aspects are described herein in connection with thresholds. As used herein, satisfying a threshold may refer to a value being greater than, greater than or equal to, less than, less than or equal to, or equal to the threshold.

As used herein, the term "communicate" may refer to the reception, receipt, transmission, transfer, provision, and/or the like of information (e.g., data, signals, messages, instructions, commands, and/or the like). As an example, for one unit (e.g., a device, a system, a component of a device or system, combinations thereof, and/or the like) to communicate with another unit means that the one unit is able to directly or indirectly receive information from and/or transmit information to the other unit. The one unit may communicate with the other unit even though the information may be modified, processed, relayed, and/or routed between the one unit and the other unit. In one example, a first unit may communicate with a second unit even though the first unit receives information and does not communicate information to the second unit. As another example, a first unit may communicate with a second unit if an intermediary unit (e.g., a third unit located between the first unit and the second unit) receives information from the first unit, processes the information received from the first unit to produce processed information, and communicates the processed information to the second unit. In some non-limiting embodiments or aspects, a message may refer to a packet (e.g., a data packet, a network packet, and/or the like) that includes data.

As used herein, the term "transaction service provider" may refer to an entity that receives transaction authorization requests from merchants or other entities and provides guarantees of payment, in some cases through an agreement between the transaction service provider and an issuer. For example, a transaction service provider may include a payment network, such as Visa®, MasterCard®, American Express®, or any other entity that processes transactions. As used herein "transaction service provider system" may refer to one or more systems operated by or operated on behalf of a transaction service provider, such as a transaction service provider system executing one or more software applications associated with the transaction service provider. In some non-limiting embodiments or aspects, a transaction service provider system may include one or more servers operated by or operated on behalf of a transaction service provider.

As used herein, the term "issuer" may refer to one or more entities that provide one or more accounts (e.g., a credit account, a debit account, a credit card account, a debit card account, and/or the like) to a user (e.g., customer, consumer, and/or the like) for conducting transactions (e.g., payment transactions). For example, an issuer may provide an account identifier, such as a primary account number (PAN), to a user that uniquely identifies one or more accounts associated with the user. The account identifier may be used by the user to conduct a payment transaction. In some non-limiting embodiments or aspects, an issuer may be associated with a bank identification number (BIN) that uniquely identifies the issuer. As used herein "issuer system" may refer to one or more systems operated by or operated on behalf of an issuer. For example, an issuer system may refer to a server executing one or more software applications associated with the issuer. In some non-limiting embodiments or aspects, an issuer system may include one or more servers (e.g., one or more authorization servers) for authorizing a payment transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. The terms "point-of-sale system," "POS system," or "POS terminal," as used herein, may refer to one or more computers and/or peripheral devices used by a merchant to engage in payment transactions with customers, including one or more card readers, near-field communication (NFC) receivers, radio-frequency identification (RFID) receivers, and/or other contactless transceivers or receivers, contact-based receivers, payment terminals, computers, servers, input devices, and/or other like devices that can be used to initiate a payment transaction. A POS terminal may be located proximal to a user, such as at a physical store location, or a POS terminal may be remote from the user, such as a server interacting with a user browsing on their personal computer. POS terminals may include mobile devices.

As used herein, the term "account identifier" may refer to one or more types of identifiers associated with an account (e.g., a unique identifier of an account, an account number, a PAN, a card number, a payment card number, a token, and/or the like) of a user. In some non-limiting embodiments or aspects, an issuer may provide an account identifier to a user that uniquely identifies one or more accounts associated with that user. In some non-limiting embodiments or aspects, an account identifier may be embodied on a payment device (e.g., a payment card, a credit card, a debit card, and/or the like) and/or may be electronic information communicated to the user that the user may use for electronic payment transactions. In some non-limiting embodiments or aspects, an account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten by the user, stolen from the user, and/or the like, a supplemental account identifier may be provided to the user. In some non-limiting embodiments or aspects, an account identifier may be directly or indirectly associated with an issuer such that an account identifier may be a token that maps to a PAN or other type of identifier. Account identifiers may be alphanumeric, any combination of characters and/or symbols, and/or the like.

As used herein, the term "computing device" may refer to one or more electronic devices that include one or more processors. A computing device may be a stationary computer or a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also include components to send, receive, and/or process data, such as but not limited to memory, a display device, an input device, a network interface, and/or the like.

As used herein, the term "payment device" may refer to a payment card, such as a credit card, a debit card, a charge card, a gift card, a payroll card, and/or the like, associated with an account identifier of a payment account. In some non-limiting embodiments or aspects, a payment device may include an electronic payment device, such as a smartcard, a chip card, integrated circuit card, and/or the like. An electronic payment device may include an embedded integrated circuit and the embedded integrated circuit may include a data storage medium (e.g., volatile and/or non-volatile memory) to store information associated with the payment device, such as an account identifier, a name of the account holder, and/or the like.

As used herein, the term "payment device token" may refer to an identifier that is used as a substitute or replacement identifier for a payment device identifier, such as a credit card number. A payment device token may be used as a substitute or replacement identifier for an account identifier, such as a PAN. Payment device tokens may be associated with an account identifier or other payment device identifiers in one or more data structures (e.g., one or more databases and/or the like) such that they may be used to conduct a transaction without directly using the original payment device identifier. In some non-limiting embodiments or aspects, an original payment device identifier may be associated with a plurality of payment device tokens for different individuals or purposes. One or more payment device tokens may be assigned to and/or stored by one or more token holders, e.g., entities and/or devices configured to store one or more payment device tokens to facilitate one or more transactions, either temporarily or indefinitely, for one or more concurrent or future transactions. Token holders may include, but are not limited to, merchants, network-enabled devices (e.g., smart refrigerators, in-home personal assistant hubs, smart cars, etc.), loan servicers, utility providers, and/or the like. Payment device tokens may be unique to each token holder.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "system" may refer to one or more devices, such as one or more processors, servers, and computing devices that include software applications, and/or the like.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network. A client device may further include a desktop computer, laptop computer, mobile computer (e.g., smartphone), a wearable computer (e.g., a watch, pair of glasses, lens, clothing, and/or the like), a cellular phone, a network-enabled appliance (e.g., a network-enabled television, refrigerator, thermostat, and/or the like), a point of sale (POS) system, and/or any other device, system, and/or software application configured to communicate with a remote device or system.

Non-limiting embodiments or aspects of the present disclosure are directed to a system, method, and computer program product for updating and processing payment device transaction tokens. Described systems and methods improve over prior art systems by reducing the number of computational steps required to update payment-device tokens, while also eliminating the technical steps of notifying each token-assigned merchant of token updates and pushing new tokens to each merchant. Moreover, activating new payment devices and generating new tokens does not interrupt the operation of an ongoing token-transaction system, therefore eliminating potential merchant connectivity downtime due to pushing new tokens to each token-assigned merchant. Additionally, computational or transaction errors created by merchants committing transaction authorization requests with outdated tokens are reduced in the systems and methods described herein. Further, described systems and methods provide operational resilience by allowing for multiple generations of token updates, while still allowing merchants having disparate token generations to continue to engage with the transaction processing system. Further improvements and advantages of the present disclosure are described in detail below.

With specific reference to FIG. 1, and in non-limiting embodiments or aspects, provided is a system 100 for updating and processing payment device transaction tokens. The system 100 includes a user 102 having an old payment device 104 to be replaced by a new payment device 106. The old payment device 104 and the new payment device 106 are issued by at least one issuer 107 having at least one issuer system 108, which may have one or more servers. The issuer system 108 may be communicatively connected to an account database 110, wherein user account data is stored, such as payment device data, active payment device token(s), user name, user birth date, user social security number, user address, account number, account balance, transaction history, and/or the like. When a user 102 engages in a transaction with a merchant, such as with the old payment device 104, a payment device identifier is provided to the merchant and communicated to a transaction service provider system, which communicates with the issuer system 108 to complete the transaction with the merchant. A payment device token may be used as a payment device identifier to complete transactions. At an initial state, where the new payment device 106 has not been issued yet, at least one old payment device token corresponds to an old payment device 104, and one or more token holders 112 may be assigned and/or store an old payment device token associated with the old payment device 104. Each token holder 112 may be assigned and/or store a unique old payment device token.

With further reference to FIG. 1, and in further non-limiting embodiments or aspects, before the old payment device 104 is replaced by the new payment device 106, token holders 112 may complete transactions with/for the user 102 using old payment device tokens, by communicating an old payment device token to a token management server 114 and/or transaction service provider system 115. The token management server 114 may be associated with a transaction service provider system 115 of a transaction service provider (e.g., the token management server 114 may be integral to the transaction service provider system 115, the token management server 115 may be communicatively connected to the transaction service provider system 115, and/or the like). An old payment device token may be communicated to the token management server 114 from a token holder 112, directly or indirectly via the transaction service provider system 115. For example, the token holder 112 may communicate a request to complete a transaction including an old payment token to a transaction service provider system 115, which may use the token management server 114 to verify that the old payment token is the most-up-to-date token for the given user's 102 payment device and the given token holder 112. The token management server 114 is communicatively connected to a token database 116, which may include a token map 118. The token map 118 may be a data structure that includes data of payment device tokens, which may be stored in relation to each other, payment devices, and/or token holders. Prior to replacement of the old payment device 104, the token map 118 may indicate the old payment device token as the most up-to-date token.

With further reference to FIG. 1, and in further non-limiting embodiments or aspects, prior to replacement of the old payment device 104, the token management server 114 or the transaction service provider system 115 may communicate a transaction authorization request (e.g., in response to a token holder's 112 transaction request) to an issuer system 108 of an issuer 107 of the old payment device 104. The transaction authorization request may include the most up-to-date payment device token for a token holder 112, which prior to replacement of the old payment device 104 may be the old payment device token. The transaction authorization request may also include another payment device identifier, in addition to or in substitution for a payment device token. The issuer system 108 may then complete the transaction by verifying the request with account data from the account database 110, such as to correspond the old payment device 104 with the old payment device token or other payment device identifier. For example, a token holder 112 may be a utility provider for the user 102, and the token holder 112 may use an old payment device token to initiate an automatic utility bill payment.

The transaction service provider system 115 may receive the request, identify the old payment device token by the token management server 114 as the most up-to-date, and communicate with the issuer system 108 to debit an account of the user 102 and credit an account of the utility provider.

With further reference to FIG. 1, and in further non-limiting embodiments or aspects, a number of steps are executed in the system 100 when the old payment device 104 is replaced by a new payment device 106. For one, the issuer system 108 communicates with the user 102 to replace the old payment device 104 (e.g., update the old payment device 104 to effectively become a new payment device 106, physically issue a new payment device 106, and/or the like), thereby providing the user 102 with a new payment device 106 that supersedes/replaces the old payment device 104. The issuer system 108, a token holder 112, or another entity may communicate with the token management server 114 an update request to update the stored transaction information, e.g., the token map 118. The token management server 114 may then generate one or more new payment device tokens associated with the new payment device 106. The token management server 114 may link one or more new payment device tokens to one or more old payment device tokens in the token map 118 of the token database 116, e.g., by pointer, by reference, by storage in a same data structure, and/or the like. For example, the token management server 114 may have three old payment device tokens stored corresponding to the old payment device 104 for three token holders 112, e.g., a utility provider, an online merchant, and an in-home personal assistant hub. The token management server 114 may generate a new payment device token for each old payment device token of the token holders 112, and link each new payment device token to its corresponding old payment device token.

With further reference to FIG. 1, and in further non-limiting embodiments or aspects, token holders 112 may not be notified of the replacement of the old payment device 104 with the new payment device 106. Because a token holder 112 may not be notified that the old payment device 104 has been replaced, a token holder 112 may still communicate with a token management server 114 or transaction service provider system 115 to request a transaction to be completed using an old payment device token. The token management server 114 may receive the request having the old payment device token and identify a corresponding new payment device token that is linked to the old payment device token in the token map 118. If there have been multiple payment device replacements, the links between tokens may be more than one (e.g., stored in a series configuration, such as the oldest token linked to the next oldest token, linked to the next oldest token, linked to the newest token; further examples are provided in connection with FIG. 2). In response to receiving a request from a token holder 112 having an outdated payment device token, the token management server 114 may communicate the new payment device token to the requesting token holder 112 to prevent repeated requests with the old payment device token.

With further reference to FIG. 1, and in further non-limiting embodiments or aspects, because the token management server 114 is configured to identify the active new payment device token via one or more links to an old payment device token, the token management server 114 or the transaction service provider system 115 may complete the originally requested transaction of the token holder 112 by communicating a transaction authorization request having the new payment device token and/or another identifier of the new payment device to the issuer system 108. In this manner, it is not necessary to identify and notify all token holders 112 at the time of updating payment device tokens, because old payment device tokens may still be used to identify the new payment device token for processing of the requested transaction. It will further be appreciated that payment device tokens may be regenerated/updated without a new payment device having been issued. The same methods of generating a new token, linking the new token to the old token and processing incoming transactions of the old token by the link to the new token, may be conducted even without the replacement of an old payment device with a new payment device.

With further reference to FIG. 1, and in further non-limiting embodiments or aspects, it will be appreciated that payment device tokens stored by token holders 112 may not directly correspond to tokens stored by an issuer system 108. For example, a number of payment device tokens stored by a number of token holders 112 may correspond to a same payment device token stored by an issuer system 108, such that when a payment device token of a token holder 112 is received by an issuer system 108, a corresponding payment device token is identified in the account database 110. Still more, the issuer system 108 may alternatively not store payment device tokens but may rely on the transaction service provider system 115 to identify the most up-to-date payment device token as stored in the token map 118 and parse or correspond the payment device token to a different payment device identifier, which may then be provided to the issuer system 108 for transaction processing.

Figure 2:
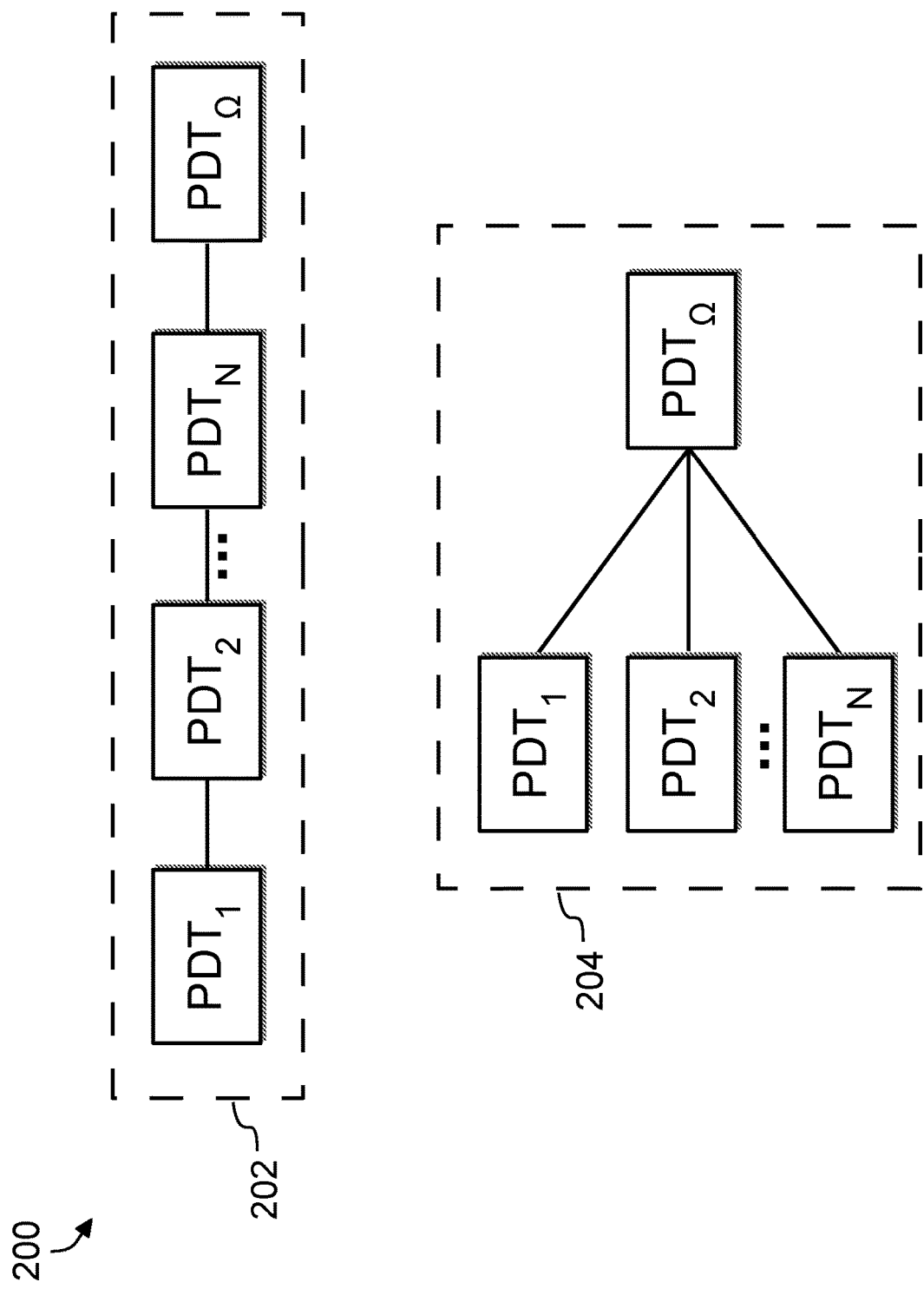
FIG. 2 is a schematic diagram of embodiments or aspects of a system for updating and processing payment device transaction tokens.

With further reference to FIG. 1, and with specific reference to FIG. 2, in non-limiting embodiments or aspects, for a token map 118 having a set of linked payment device tokens having more than two payment device tokens, the configuration of the linking between old payment device tokens and new payment device tokens may vary. For example, the token map 118 may have a set of payment device tokens (individually "PDT"), including a first and oldest payment device token ($PDT_1$), a second and next oldest payment device token ($PDT_2$), and so forth, up to and including a second newest payment device token ($PDT_N$), and the newest (and active) payment device token ($PDT_\Omega$). The set of payment device tokens may be in a series configuration 202 (e.g., a "chain"), wherein each payment device token is linked to the next newest payment device token, from $PDT_1$ to $PDT_2$, to $PDT_N$, to $PDT_\Omega$. The set of payment device tokens may also be in a parallel configuration 204, wherein each older payment device token is linked to the newest payment device token, such as $PDT_1$ and $PDT_2$ and $PDT_N$ each linked to $PDT_\Omega$. The set of payment device tokens may also be in a combination of both series configuration 202 and parallel configuration 204, wherein some payment device tokens are linked in series and others are linked in parallel. Many configurations are possible, and various storage space, usability, and search efficiency parameters may inform the structure of token linking in the token map 118. In the depicted examples, although indefinite sets of size N+1 are shown, it will be appreciated that $PDT_N$ may be equivalent to $PDT_2$ for a three-element set.

With further reference to FIG. 1, and in further non-limiting embodiments or aspects, a number of steps may be executed in the system 100 when fraudulent activity is detected for an old payment device 104, particularly to prevent fraudulent transactions from being passed on and connected to the new payment device 106 that has replaced the compromised old payment device 104. The token management server 114 may receive a notification of fraudulent activity associated with an old payment device 104. Such a fraud notification may be communicated to the token management server 114 by the transaction service provider system 115, if configured with a fraud analysis/detection system, or from an issuer system 108 or other fraud-identifying entity. The token management server 114 may then determine one or more old payment device tokens associated with the old payment device 104 that has been compromised. The token management server 114 may also identify any newer payment device tokens linked to the old payment device tokens and modify storage of the newer payment device tokens to deactivate links to the old payment device tokens of the compromised old payment device 104.

With further reference to FIG. 1, and specific reference to FIG. 2, in further non-limiting embodiments or aspects, the token management server 114 and/or transaction service provider system 115 may thereafter decline any new transaction requests that include the old payment device tokens associated with the compromised old payment device 104. For a series configuration 202 of payment device tokens, the link from the compromised old payment device token to newer payment device tokens may be deactivated. For example, if $PDT_2$ is compromised, the link from $PDT_2$ to $PDT_N$ in configuration 202 may be removed or marked as invalid for transactions. Older payment device tokens, not associated with the compromised old payment device, may be pruned from the set of tokens (e.g., $PDT_1$ may be removed), or may be re-linked to the newer tokens (e.g., $PDT_1$ may be linked to $PDT_N$ and $PDT_2$ may be flagged or removed). For a parallel configuration 204 of payment device tokens, the link from the compromised old payment device token to newer payment device tokens may be deactivated (e.g., the link from $PDT_2$ to $PDT_N$ in configuration 204 may be removed).

With further reference to FIG. 1, and in further non-limiting embodiments or aspects, a number of steps may be executed in the system 100 when fraudulent activity is detected for the new payment device 106 to prevent fraudulent transactions from being incurred on the compromised new payment device 106. The token management server 114 may receive a notification of fraudulent activity associated with the new payment device 106. Such a fraud notification may be communicated to the token management server 114 by the transaction service provider system 115, if configured with a fraud analysis/detection system, or from an issuer system 108 or other fraud-identifying entity. The token management server 114 may then determine one or more new payment device tokens associated with the new payment device 106 that has been compromised. The token management server 114 may also identify any older payment device tokens linked to the new payment device tokens and modify storage of the older payment device tokens to deactivate one or more links to the new payment device tokens of the compromised new payment device 106. Thereafter, replacement payment device tokens may be generated to replace the new payment device tokens of the compromised new payment device 106, and the replacement payment device tokens may likewise be associated with a replacement payment device provided by the issuer 107.

With further reference to FIG. 1, and specific reference to FIG. 2, in further non-limiting embodiments or aspects, the token management server 114 and/or transaction service provider system 115 may thereafter decline any new transaction requests that include the new payment device tokens associated with the compromised new payment device 106. For a series configuration 202 of payment device tokens, the new payment device token (e.g., $PDT_Ω$) may be removed from the set and the second newest payment device token (e.g., $PDT_N$) may be re-linked to a replacement payment device token. Alternatively, all payment device token links may be deactivated, and one or more payment device tokens may be removed from the token map 118 altogether (e.g., remove $PDT_1$, $PDT_2$, $PDT_N$, and $PDT_Ω$, and inject replacement PDT). For a parallel configuration 204 of payment device tokens, the newest payment device token (e.g., $PDT_Ω$) may be removed and the remaining payment device tokens (e.g., $PDT_1$, $PDT_2$, and $PDT_N$) may be re-linked to a replacement device token. For the purposes of the above description of FIG. 2, "removing" a payment device token may refer to deleting the payment device token from a token map or modifying the payment device token data to mark it as unusable, invalid, and/or the like. Furthermore, "deactivating" a link between two payment device tokens may refer to removing a link, marking a link as unusable, invalid, and/or the like, or removing a payment device token of the linked tokens that is associated with a compromised payment device.

Figure 3:
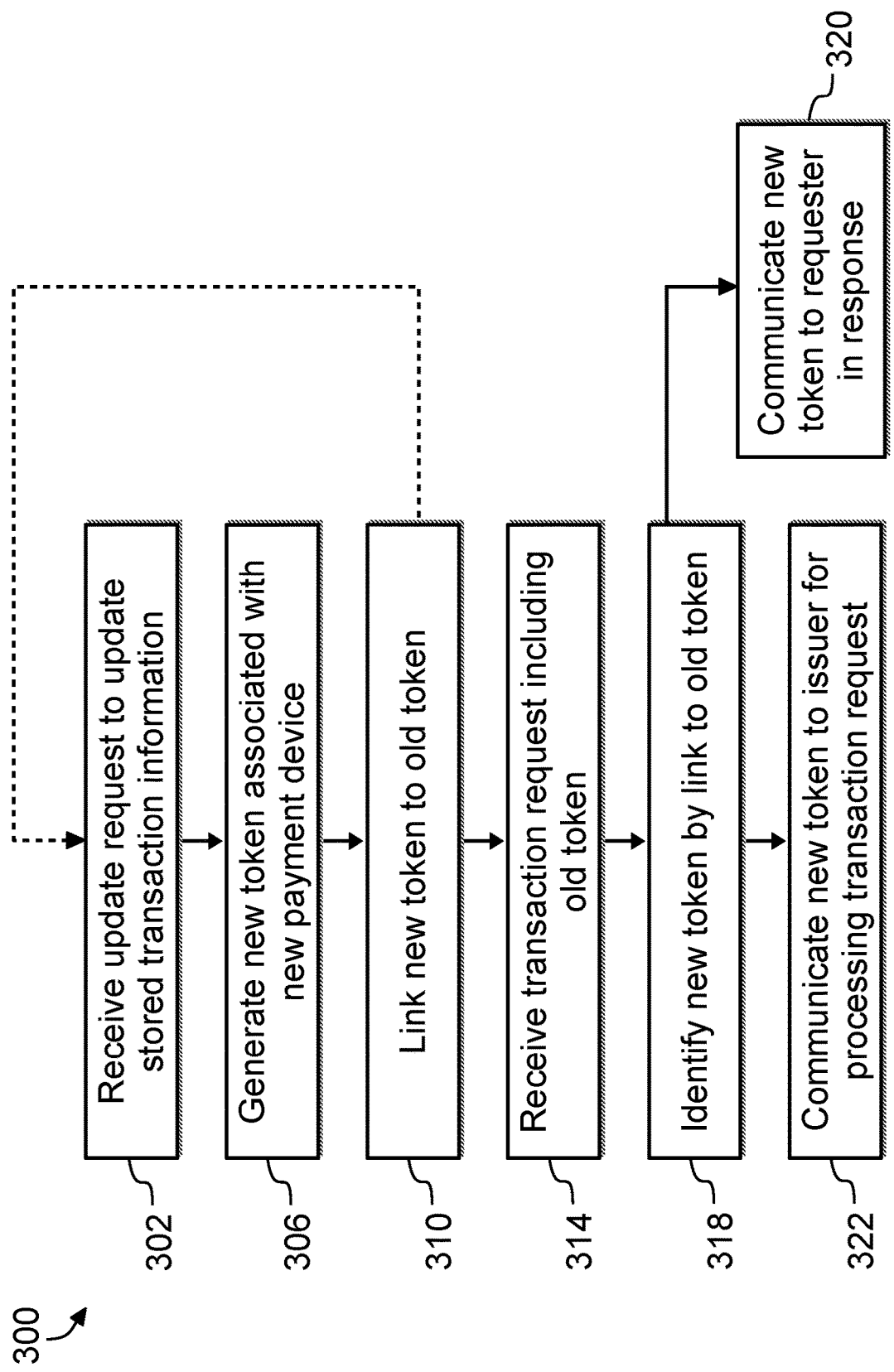
FIG. 3 is a process diagram of embodiments or aspects of a system for updating and processing payment device transaction tokens.

With specific reference to FIG. 3, and in non-limiting embodiments or aspects, provided is a method 300 for updating and processing payment device transaction tokens. One or more of the steps of method 300 may be carried out by one or more processors of a token management server, a transaction service provider system, an issuer system, another computing device, or any combination thereof. In step 302, the token management server receives an update request to update stored transaction information, e.g., a token map. The update request may identify at least one old payment device and at least one new payment device. The update request may be from an issuer system to designate a new payment device as replacing an old payment device, or may be initiated by a token holder or other transactional entity. In step 306, the token management server generates a new payment device token associated with the new payment device of the update request. In step 310, the token management server links the generated new payment device token to one or more old payment device tokens. Steps 302, 306, and 310 may be repeated, as old payment devices are updated/replaced with new payment devices, to produce a set of stored payment devices with multiple linked payment devices (see FIG. 2 for non-limiting embodiments or aspects of payment device token linking). It will also be appreciated that the update request may not identify old and new payment devices, but may instead include an old payment device token that needs to be replaced. In such a circumstance, the token management server may simply generate a new payment device token in step 306, and link the new payment device token to the old payment device token in step 310. The token management server may also then communicate the new payment device token that was generated to the sender of the update request, e.g., the issuer system. Identifying the old payment device may also be done indirectly by another identifier, such as a user identifier or account identifier, by which the old payment device may be ascertained.

With further reference to FIG. 3, and in further non-limiting embodiments or aspects, in step 314, the token management server or transaction service provider system may receive a request to complete a transaction including an old payment device token, such as from a token holder, e.g., a merchant. In step 318, the token management server may identify the new payment device token by a link, or number of connected links, to the old payment device token. In step 320, the token management server or transaction service provider system may communicate the identified new payment device token to the requester of the transaction, to notify the requester that the old payment device token is outdated and to provide the active, new payment device token. In step 322, the token management server or transaction service provider system may communicate the new payment device token and/or another payment device identifier to an issuer system for processing of the transaction request. In such a manner, a token holder's payment device token may be updated on an as-needed basis, and transaction requests are not automatically denied because an old payment device token has been replaced with a new payment device token. A status of the old payment device token, in step 322, may also be modified to prevent the old payment device token from being communicated to issuers (e.g., flagged as deactivated" or "outdated").

With further reference to FIG. 3, and in further non-limiting embodiments or aspects, step 302 may include an update request with a plurality of old tokens, wherein step 306 includes generating a new payment device token for each old token, and step 310 includes linking the newly generated tokens to each respective old token. Moreover, a number of new payment device tokens may be generated for a new payment device. Each new payment device token may be associated with a different token holder, and each new payment device token may be unique.

Figure 4:
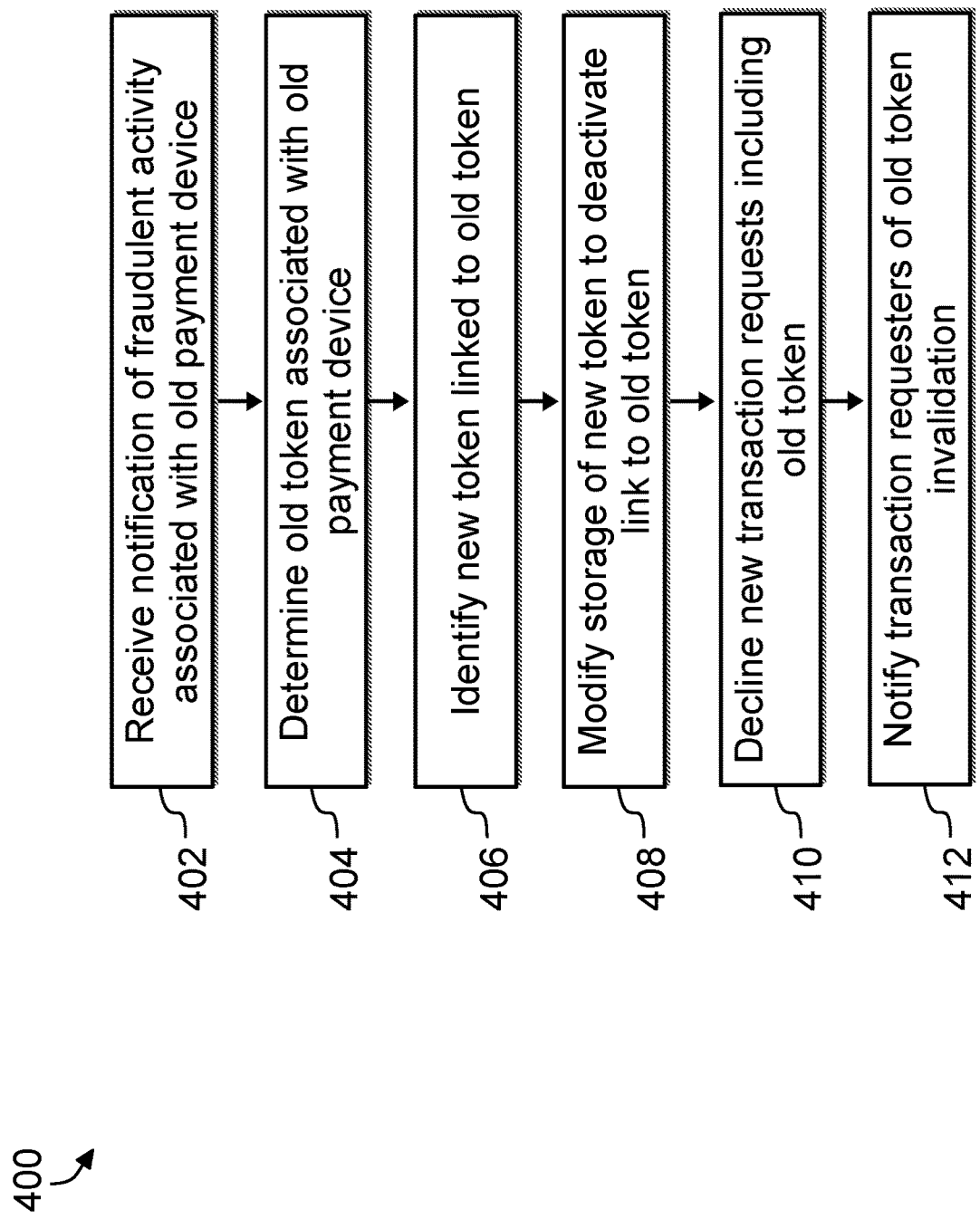
FIG. 4 is a process diagram of embodiments or aspects of a system for updating and processing payment device transaction tokens.

With specific reference to FIG. 4, and in non-limiting embodiments or aspects, provided is a method 400 for updating and processing payment device transaction tokens. Method 400 may follow method 300 of FIG. 3, described above. Furthermore, one or more steps of method 400 may be carried out by one or more processors of a token management server, a transaction service provider system, an issuer, another computing device, or any combination thereof. In step 402, the token management server may receive a notification of fraudulent activity associated with an old payment device, from an issuer, the transaction service provider system, a token holder, or other fraud-identifying entity. In step 404, the token management server may determine an old token associated with the old payment device. Alternatively, the token management server, in combined steps 402 and 404, may receive a notice of fraudulent activity associated with an old payment device token. In step 406, the token management server may identify a new payment device token linked to the old payment device token. In step 408, the token management server may modify storage of the new payment device token to deactivate a link to the old token. The token management server may also remove the old payment device token from the token map. In step 410, the token management server may receive and decline any new transaction requests that include the old payment device token. In step 412, the token management server may notify those transaction requesters, e.g., token holders, that the old payment device token has been invalidated/deactivated. Because the old payment device token was associated with fraud, transaction requesters may not automatically be provided with a new payment device token, and a user may be prompted to re-authorize token holders.

With specific reference to FIG. 5, and in non-limiting embodiments or aspects, provided is a method 500 for updating and processing payment device transaction tokens. Method 500 may follow method 300 of FIG. 3, described above. Furthermore, one or more steps of method 500 may be carried out by one or more processors of a token management server, a transaction service provider system, an issuer, another computing device, or any combination thereof. In step 502, the token management server may receive a notification of fraudulent activity associated with a new payment device (e.g., a currently active payment device), from an issuer, the transaction service provider system, a token holder, or other fraud-identifying entity. In step 504, the token management server may determine a new token associated with the new payment device. Alternatively, the token management server, in combined steps 502 and 504, may receive a notice of fraudulent activity associated with a new payment device token. In step 506, the token management server may modify a status of the new payment device token to prevent the new payment device token from being communicated to issuers. In step 508, the token management server may receive and decline any new transaction requests that include the new payment device token. In step 509, the token management server may notify those transaction requesters, e.g., token holders, that the new payment device token has been invalidated. Because the new payment device token was associated with fraud, transaction requesters may not automatically be provided with a replacement payment device token, and a user may be prompted to re-authorize token holders.

With further reference to FIG. 5, and in further non-limiting embodiments or aspects, in step 510, the token management server may communicate with the issuer of the new payment device, which has been compromised, to receive replacement payment device data. If the token management server is configured to store payment device tokens not in relation to payment device data, the token management server may instead prompt the issuer to issue a replacement payment device. In step 512, the token management server may generate a replacement payment device token for the compromised new payment device token. In step 512, the token management server may also communicate the replacement payment device token to the issuer of the replacement payment device. For token holders that are authorized by a user to receive the replacement payment device token, the token management server may communicate the replacement payment device token to token holders.

Although the disclosure has been described in detail for the purpose of illustration based on what is currently considered to be the most practical and non-limiting embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method comprising:
receiving, with at least one processor, a first notification based on issuance of at least one first new payment device;
in response to receiving the first notification, generating, with at least one processor, at least one first new token associated with the at least one first new payment device;
linking, with at least one processor and in at least one database, the at least one first new token to at least one previous token associated with at least one previously issued payment device;
receiving, with at least one processor, a second notification based on issuance of at least one second new payment device;

in response to receiving the second notification, generating, with at least one processor, at least one second new token associated with the at least one second new payment device;

linking, with at least one processor and in the at least one database, the at least one second new token to the at least one first new token such that the at least one previous token, the at least one first new token, and the at least one second new token are serially linked in a chain of tokens;

determining, with at least one processor, to deactivate the at least one first new payment device;

in response to determining to deactivate the at least one first new payment device, modifying, with at least one processor and in the at least one database, the chain to remove a first link from between the at least one previous token and the at least one first new token, to remove a second link from between the at least one first new token and the at least one second new token, and to link the at least one previous token to the at least one second new token;

receiving, with at least one processor, a transaction request comprising a token of the chain generated before the at least one second new token; and processing the transaction request by communicating, with at least one processor, the at least one second new token to an issuer.

2. The method of claim 1, further comprising modifying, with at least one processor, a status of each token in the chain generated before the at least one second new token to prevent said each token from being communicated to issuers.

3. The method of claim 1, wherein determining to deactivate the at least one first new payment device further comprises receiving, with at least one processor, at least one notification of fraudulent activity associated with the at least one first new payment device.

4. The method of claim 1, wherein the at least one previous token comprises a plurality of tokens, and wherein linking the at least one first new token to the at least one previous token further comprises linking the at least one first new token to each of the at least one previous token.

5. The method of claim 4, wherein each token in the chain is unique.

6. The method of claim 1, further comprising declining, with at least one processor, each new transaction request of at least one new transaction request that comprises the at least one first new token.

7. The method of claim 1, further comprising:
receiving, with at least one processor, a notification of fraudulent activity associated with the at least one second new payment device;
modifying, with at least one processor in the at least one database, a status of the at least one second new token to prevent the at least one second new token from being communicated to issuers; and
declining, with at least one processor, each new transaction request of at least one new transaction request that comprises the at least one second new token.

8. A system comprising a server including at least one processor for executing program instructions, the server being programmed or configured to:
receive a first notification based on issuance of at least one first new payment device;
in response to receiving the first notification, generate at least one first new token associated with the at least one first new payment device;
link, in at least one database, the at least one first new token to at least one previous token associated with at least one previously issued payment device;
receive a second notification based on issuance of at least one second new payment device;
in response to receiving the second notification, generate at least one second new token associated with the at least one second new payment device;
link, in the at least one database, the at least one second new token to the at least one first new token so that the at least one previous token, the at least one first new token, and the at least one second new token are serially linked in a chain of tokens;
determine to deactivate the at least one first new payment device;
in response to determining to deactivate the at least one first new payment device, modify, in the at least one database, the chain to remove a first link from between the at least one previous token and the at least one first new token, to remove a second link from between the at least one first new token and the at least one second new token, and to link the at least one previous token to the at least one second new token;
receive a transaction request comprising a token of the chain generated before the at least one second new token; and
process the transaction request by communicating the at least one second new token to an issuer.

9. The system of claim 8, wherein the server is further programmed or configured to modify a status of each token in the chain generated before the at least one second new token to prevent said each token from being communicated to issuers.

10. The system of claim 8, wherein determining to deactivate the at least one first new payment device further comprises receiving at least one notification of fraudulent activity associated with the at least one first new payment device.

11. The system of claim 8, wherein the at least one previous token comprises a plurality of tokens, and wherein linking the at least one first new token to the at least one previous token comprises linking the at least one first new token to each of the at least one previous token.

12. The system of claim 11, wherein each token in the chain is unique.

13. The system of claim 8, wherein the server is further programmed or configured to decline each new transaction request of at least one new transaction request comprising the at least one first new token.

14. The system of claim 8, wherein the server is further programmed or configured to:
receive a notification of fraudulent activity associated with the at least one second new payment device;
modify, in the at least one database, a status of the at least one second new token to prevent the at least one second new token from being communicated to issuers; and
decline each new transaction request of at least one new transaction request that comprises the at least one second new token.

15. A computer program product comprising at least one non-transitory computer-readable medium including program instructions that, when executed by at least one processor, cause the at least one processor to:
receive a first notification based on issuance of at least one first new payment device;

in response to receiving the first notification, generate at least one first new token associated with the at least one first new payment device;

link, in at least one database, the at least one first new token to at least one previous token associated with at least one previously issued payment device;

receive a second notification based on issuance of at least one second new payment device;

in response to receiving the second notification, generate at least one second new token associated with the at least one second new payment device;

link, in the at least one database, the at least one second new token to the at least one first new token so that the at least one previous token, the at least one first new token, and the at least one second new token are serially linked in a chain of tokens;

determine to deactivate the at least one first new payment device;

in response to determining to deactivate the at least one first new payment device, modify, in the at least one database, the chain to remove a first link from between the at least one previous token and the at least one first new token, to remove a second link from between the at least one first new token and the at least one second new token, and to link the at least one first new token to the at least one second new token;

receive a transaction request comprising a token of the chain generated before the at least one second new token; and process the transaction request by communicating the at least one second new token to an issuer.

16. The computer program product of claim 15, wherein the program instructions further cause the at least one processor to modify a status of each token in the chain generated before the at least one second new token to prevent said each token from being communicated to issuers.

17. The computer program product of claim 15, wherein determining to deactivate the at least one first new payment device further comprises receiving at least one notification of fraudulent activity associated with the at least one first new payment device.

18. The computer program product of claim 15, wherein the at least one previous token comprises a plurality of tokens, wherein linking the at least one first new token to the at least one previous token comprises linking the at least one first new token to each of the at least one previous token, and wherein each token in the chain is unique.

19. The computer program product of claim 15, wherein the program instructions further cause the at least one processor to decline each new transaction request of at least one new transaction request that comprises the at least one first new token.

20. The computer program product of claim 15, wherein the program instructions further cause the at least one processor to:

receive a notification of fraudulent activity associated with the at least one second new payment device;

modify, in the at least one database, a status of the at least one second new token to prevent the at least one new second token from being communicated to issuers; and decline each new transaction request of at least one new transaction request that comprises the at least one second new token.

* * * * *